United States Patent
Stahle et al.

(10) Patent No.: US 11,639,193 B2
(45) Date of Patent: May 2, 2023

(54) SYSTEMS AND METHODS FOR VEHICLE TRAVEL SPEED DEPENDENT STEERING RAMP RATES

(71) Applicant: DEERE & COMPANY, Moline, IL (US)

(72) Inventors: Scott R. Stahle, Dubuque, IA (US); Kevin W. Campbell, Dubuque, IA (US); Matthew J. Sbai, Dubuque, IA (US); Joel D. Banninga, Dubuque, IA (US)

(73) Assignee: Deere & Company, Moline, IL (US)

( * ) Notice: Subject to any disclaimer, the term of this patent is extended or adjusted under 35 U.S.C. 154(b) by 348 days.

(21) Appl. No.: 16/943,153

(22) Filed: Jul. 30, 2020

(65) Prior Publication Data
US 2022/0032997 A1 Feb. 3, 2022

(51) Int. Cl.
*B62D 5/07* (2006.01)
*B62D 6/00* (2006.01)
*B62D 5/12* (2006.01)

(52) U.S. Cl.
CPC .............. *B62D 5/07* (2013.01); *B62D 5/12* (2013.01); *B62D 6/001* (2013.01)

(58) Field of Classification Search
CPC ............ B62D 5/07; B62D 5/12; B62D 6/001
See application file for complete search history.

(56) References Cited

U.S. PATENT DOCUMENTS

| | | | |
|---|---|---|---|
| 2005/0209752 A1* | 9/2005 | Ono | B62D 5/008 701/41 |
| 2018/0087242 A1* | 3/2018 | Mitchell | E02F 3/431 |
| 2019/0084615 A1* | 3/2019 | Takenaka | B62D 3/14 |

\* cited by examiner

*Primary Examiner* — Adam D Tissot (57) ABSTRACT

Systems and methods for steering a vehicle that adjust how quickly a selected steering input is achieved based on a speed at which the vehicle is traveling are disclosed. The systems and methods include receiving a steering input, detecting a vehicle speed, and selecting a steering ramp rate that defines how quickly a steering amount corresponding to the steering input is achieved by one or more steerable components of the vehicle. In some implementations, the steering ramp rate may be affected as a result of whether the steering input is greater than or less than a previous steering input.

17 Claims, 6 Drawing Sheets

SYSTEMS AND METHODS FOR VEHICLE TRAVEL SPEED DEPENDENT STEERING RAMP RATES

FIELD OF THE DISCLOSURE

The present disclosure relates generally to steering systems of vehicles.

BACKGROUND OF THE DISCLOSURE

In the agriculture, construction, and forestry industries, various work machines, such as front loaders, may be utilized in lifting and moving various materials. In certain examples, a front loader may include a bucket pivotally coupled by a loader arms to the vehicle chassis. One or more hydraulic cylinders move the loader arms, the bucket, or both to move the bucket between positions relative to the chassis to lift and move materials.

SUMMARY OF THE DISCLOSURE

A first aspect of the present disclosure is directed to a steering system for a vehicle. The steering system may include a steering input device operable to receive a steering input and generate a steering input electrical signal in response to the received steering input; a controller; and a steering assembly. The controller may be operable to: receive the steering input electrical signal; receive a vehicle speed; determine a steering ramp rate based on the received vehicle speed; and output a steering control signal that incorporates the steering ramp rate. The steering apparatus may be operable to receive the steering control signal and articulate at least one steerable component based on the steering control signal.

A second aspect of the present disclosure is direct to a method for steering a vehicle. The method may include receiving a steering input from a steering input device; receiving a vehicle speed from a vehicle speed sensor; determining, with a controller, a desired steering response based on the steering input and a steering ramp rate that defines the rate at which the desired steering amount is to be achieved by a steering assembly based on the received vehicle speed; and articulating at least one steerable vehicle component at the steering ramp rate to the desired steering response using the steering assembly.

Another aspect of the present disclosure is directed to a vehicle. The vehicle may include at least one steerable component; a steering input device operable to receive a steering input and generate a steering input electrical signal in response to the steering input; a controller; and a steering apparatus. The controller may be operable to receive the steering input electrical signal; receive a vehicle speed; determine a steering ramp rate based on the received steering input electrical signal and the received vehicle speed; and output a steering control signal that incorporates the steering ramp rate. The steering apparatus may be operable to receive the steering control signal and articulate the at least one steerable component based on the steering control signal.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to methods and systems for steering a vehicle, such as a construction vehicle, and, particularly, to adjusting how quickly a selected steering input is achieved based on a speed at which the construction vehicle is traveling. In some instances, construction equipment, such as a loader, includes an electro-hydraulic steering system. Although electro-hydraulic steering systems are discussed below, other types of steering systems are also within the scope of the present disclosure, and the concepts described herein are applicable to other, non-electro-hydraulic steering systems.

In some implementations, electro-hydraulic steering systems receive a steering input from a user using from an input device, such as a control stick. That steering input is converted into an electrical signal. The electrical signal varies based on, for example, the amount of steering input received. For example, on a scale of zero percent to 100 percent, where zero percent represents no steering input and 100 percent representing full steering input, a user may provide an input that varies between zero and 100 percent based on an amount of input applied to the input device. In some implementations, the amount of steering input may correspond to a force applied to the input device or an amount by which the input device is displaced. For example, where the input device is a control stick, the amount of steering input may correspond to an amount by which the control stick is displaced from a neutral position (e.g., and angle of the control stick with respect to a line corresponding to a non-displaced position of the control stick, such as a line perpendicular to a base of the control stick). As the angle of the control stick increases, the steering input increases, and the electrical signal changes accordingly to reflect the increase in steering input. In other implementations, as the load applied to the input device increases, the steering input also increases. In turn, the electrical signal also changes correspondingly. In still other implementations, a steering wheel may be used, and an amount of rotation of the steering wheel corresponds to the steering input. As the amount of rotation increases, the electrical signal correspondingly changes to represent the change in steering input. Thus, a selected amount of displacement of steerable components corresponds to a selected amount of movement (e.g., pivoting) of the steerable components to effectuate a turn of the vehicle. Steerable components may be wheels or tracks of a vehicle. Articulated steering involves pivoting a portion of a vehicle having at least one wheel, track, or skid, relative to another portion of the vehicle. The portions of the vehicle may be coupled by a hinged connection. Displacement of one portion of the vehicle relative to the other effectuates steering of the vehicle. In the context of articulated steering, a steerable components is a portion of a vehicle with the wheel, tread, skid, etc., that is pivotable connected to another portion of the vehicle. A steering system that produces an amount of displacement (e.g., angular displacement) of steerable components corresponding to an amount of steering input is referred to as a Defined Steering Displacement Approach (DSDA) steering system. In some implementations, a DSDA steering system determines an amount by which the steering apparatus is to be actuated to move the steering apparatus from the current position to a desired position indicated by the steering input. In some implementations, a DSDA steering system may sense a current position of a steering apparatus.

In still other implementations, a steering input may be provided based on a duration of time an input is applied and, in some cases, an amount of displacement applied, to a steering input device. For example, in the context of a control stick, a steering input may be a combination of an amount of displacement of the control stick, e.g., from a neutral position, and an amount of time the displacement of the control stick is maintained. In such an example, the amount of displacement defines how quickly steerable components of a vehicle, e.g., one or more wheels, tracks, skis, or portion of the vehicle (e.g., in the context of articulated steering), are displaced from a first position, such as a neutral or "straight-ahead" position, to a second position. An amount of time that the rate of displacement is maintained corresponds to the amount of time of deflection of the control stick. Thus, an amount of deflection of a control stick and the duration of deflection control a rate of movement of the steerable components and the amount of time the rate of displacement is maintained. As the amount of deflection of the control stick increases, the rate at which the steerable components is moved also increases. In some implementations, the rate at which the steerable components are moved may be have a linear or non-linear correlation with the displacement of the control stick. Other implementations may include a steering wheel as a steering input device, and the amount of rotation of the steering wheel may define the rate at which the steerable components are moved. Further, in this steering wheel example, the amount of time the steering wheel is displaced from a position, such as a neutral position, defines a duration of time the steerable components are moved at the given rate. A steering system that produces a rate of movement of steerable components for a period of time based on a degree of displacement of an input device and an amount of time of the displacement is referred to as a Defined Steering Rate Approach (DSRA) steering system.

In some implementations, the electrical signal generated in response to the received steering input (also referred to as a steering control signal) is transmitted to a hydraulic flow control valve, such as via a controller, and the flow control valve is operated in a manner related to the received steering input. For example, for a DSDA steering system, if a user inputs a steering input of 80 percent, then the flow control valve is operated to produce an 80 percent of full displacement of the steerable components. For a DSRA steering system, an 80 percent displacement (or an otherwise 80 percent actuation) of the input device produces an 80 percent fluid flow through the flow control valve, which results in an 80 percent of full rate of movement of the steerable components. The 80 percent rate of movement of the steerable components is maintained for a period of time the input device is displaced or the input is otherwise maintained through the input device.

A rate at which the flow control valve reacts, e.g., a rate at which the flow control valve moves from one position to another, in response to the user input to obtain the desired steering input may be a defined rate. Thus, the rate at which the steering system achieves the desired steering input, i.e., a change in displacement or a change in rate of movement, may be controlled. The rate at which the steering system achieves the desired steering input is referred to as a "steering ramp rate" or "ramp rate." In the context of an electro-hydraulic DSRA steering system, a ramp rate is the rate at which a flow through the flow control valve is changed from a first flow rate to a second flow rate. The ramp rate affects how quickly the flow control valve is moved from a first position, e.g., a first open condition, to a second position, e.g., a second open condition. The first and second open conditions correspond to different flow rates through the flow control valve and, thus, how quickly the steering system, e.g., steerable components, react.

The ramp rate may be selected to be any desired rate and may be selected based on one or more considerations. For example, a consideration may be operator comfort. Generally, as ramp rates increase, the steering system operates more quickly, and, as a result, jerking or jarring of the vehicle (and, by extension, a vehicle operator) also increases. This jarring motion results in operator discomfort. Therefore, a ramp rate may be selected to quickly obtain a steering input while also reducing jerking or jarring of the operator.

Other considerations may include speed of the vehicle, such as ground speed of the vehicle, as well as whether the steering input is increasing compared to a previous steering input or whether the steering input is decreasing compared to a previous steering input. In some implementations, the ramp rate may progressively increase as the vehicle speed increases. A ramp rate that increases progressively as vehicle speed increases results in increased steering responsiveness and, therefore, reduces sluggishness in steering response while also maintaining operator comfort. Thus, as the speed of the vehicle increases, the rate at which the vehicle achieves the desired steering input may also increase. Consequently, as the vehicle speed increases, steering responsiveness of the vehicle also increases with the use of an increased ramp rate.

Steering ramp rates may also change in response to previous steering inputs. For example, in some implementations, for a given vehicle speed, where a steering input is increased compared a previous steering input (e.g., where displacement of a control stick is increased compared to a previous displacement of the control stick), the ramp rate may be smaller than a ramp rate associated with a steering input that is reduced compared to a previous steering input (e.g., where displacement of a control stick is decreased compared to a previous displacement of the control stick). In other implementations, the opposite may apply. Thus, in some implementations, for a given vehicle speed, where a steering input is increased compared to a previous steering input, the ramp rate may be greater than a ramp rate associated with a steering input that is reduced compared to a previous steering input. In still other implementations, for a given vehicle speed, the ramp rate may be the same regardless as to whether the steering input is less than or greater than the previous steering input. In still other implementations, a lookup table that correlates ramp rates to vehicle speed and changes in steering inputs may have ramp rates that vary when the steering input is different from a previous steering input (regardless as to whether the steering input is less than or greater than the previous steering input) or the ramp rate may be same regardless as to whether the steering input is different from a previous steering input.

Figure 1:
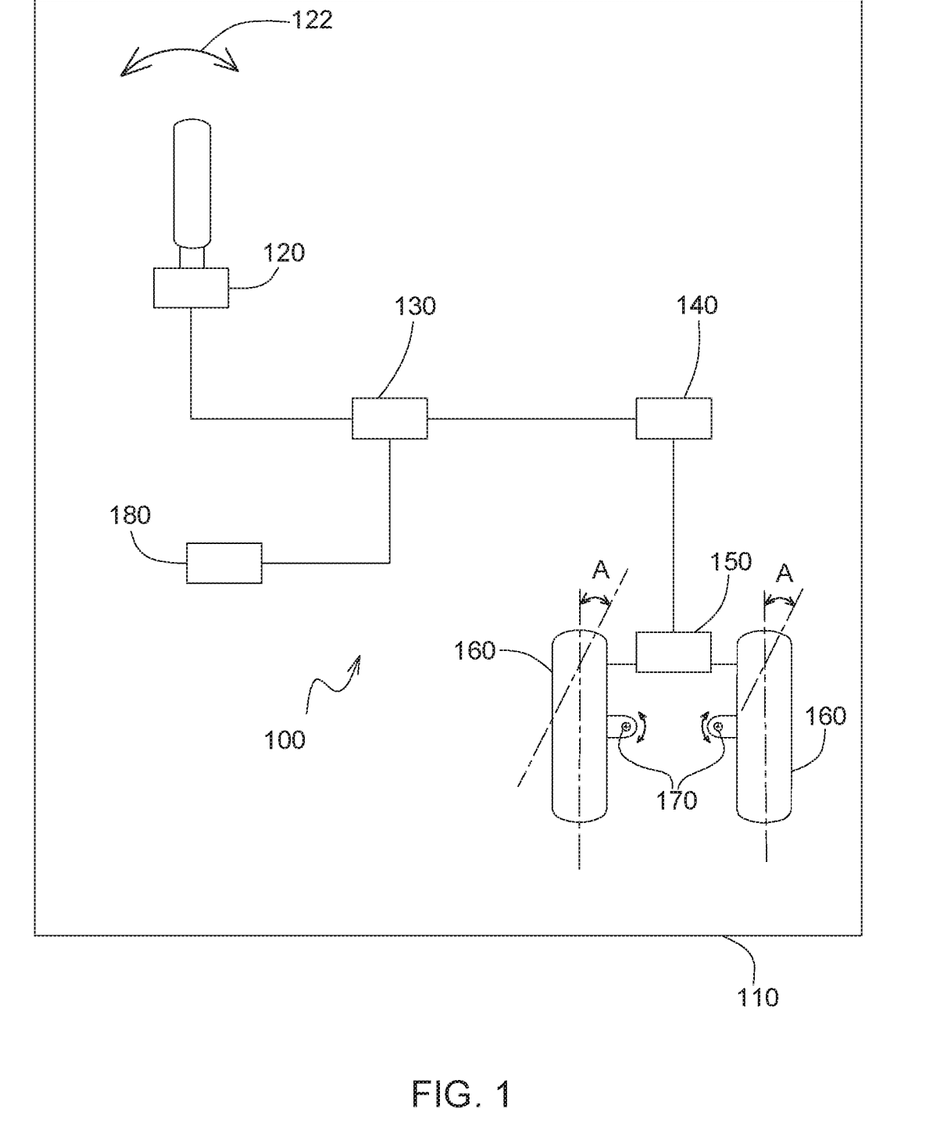
FIG. 1 is a schematic view of an example vehicle, according to some implantations of the present disclosure.

FIG. 1 is a schematic view of an example electro-hydraulic steering system 100 for a construction vehicle 110. As explained earlier, although an electro-hydraulic steering system is described, the scope of the disclosure is not so limited. Rather, other steering systems are within the scope of the present disclosure. The steering system 100 includes a control stick 120. Arrow 122 indicates directions in which the control stick 120 may be displaced to provide a steering input. In other implementations, a steering wheel or other input device may be used to provide a steering input to the construction vehicle 110. The control stick 120 converts an applied steering input into an electrical signal, referred to as a steering input electrical signal. A controller 130 receives the steering input electrical signals that represents the steering input applied to the control stick 120 and outputs a steering control signal. The controller 130 includes steering input electrical signal versus flow request relationship information, which may be in the form of an algorithm, lookup table, or other correlation type. Thus, for a given steering input electrical signal, the controller 130 generates a steering control signal that generates a fluid flow through the flow control valve corresponding to the steering input electrical signal. The steering control signal is transmitted to a flow control valve 140 and controls the flow control valve 140 to produce the fluid flow rate corresponding to the steering input. The generated flow rate manipulates steerable components, such as one or more wheels or tracks, at a rate commensurate with the steering input. Consequently, the steering control signal is transmitted to the flow control valve 140 where the steering control signal controls operation of the flow control valve 140 to provide an amount of steering corresponding to the steering input.

In some implementations, the flow control valve 140 in a DSRA steering system may be a variable valve, and the control signal generated by the controller 130 in response to the steering input is in the form of a flow control signal. The flow control signal controls a flow rate of fluid passing through the flow control valve 140 by controlling an opening size formed in the flow control valve 140. As the steering control signal represents an increased steering input, an opening size formed in the flow control valve 140 increases. As a result, the flow rate of fluid passing through the flow control valve 140 increases, resulting in an increased rate of articulation of the steerable components. The ramp rate included as part of the steering control signal from the controller 130 controls how quickly the flow control valve 140 responds, i.e., how quickly the flow control valve 140 moves from one position to another to change the flow rate from one flow rate to another. For example, if the steering control signal controls the flow control valve 140 to increase an opening size formed therein (due to, for example, an increased steering input applied to the control stick 120) and, thus, increase a flow through the flow control valve 140, a ramp rate included in the steering control signal affects how quickly the flow control valve 140 changes position to provide the larger opening within the flow control valve 140 to achieve an increased rate of movement of the steerable components corresponding to the steering input.

In some implementations, such as in a DSDA steering system, the steering control signal is operable to cause the flow control valve to move to a selected position corresponding to a selected fluid flow rate and remain open for a selected amount of time to move the steerable components to an angular position corresponding to the steering input. The selected position of the flow control valve associated with the steering control signal produces articulation of a steering apparatus, such as steering apparatus 150 (discussed in more detail below). The steering apparatus 150 seeks to move the steerable components 160 at the defined velocity until the steerable components obtain the angular position corresponding to the steering input. In some implementations, the defined rate or velocity may be related to the steering input. In other implementations, the defined rate or velocity may not be related to the steering input. When the angular position of the steerable components is achieved, the fluid flow valve is moved to a no-flow position to stop movement of the steerable components. Further, the steering control signal also includes a ramp rate that functions to accelerate movement of the steering apparatus and, consequently, the steerable components, to the defined velocity. The ramp rate and acceleration associated therewith is based on a speed of the construction vehicle 110. That is, the ramp rate produces acceleration of the steering apparatus 150 and steerable components 160 up to the defined velocity. In some implementations, the ramp rate controls how quickly the flow control valve opens to an amount that produces the defined velocity of the steerable components. Thus, a ramp rate that causes the flow control valve to open more quickly produces faster acceleration. A ramp rate that causes the flow control valve to open more slowly produces a slower acceleration. Thus, the ramp rate controls how quickly an angular velocity of the steerable components 160 is achieved, via acceleration, in the course of moving the steerable components 160 to the selected position.

The controller 130 includes information, such as in the form of programming instructions, that relates a steering input from the control stick 120 (i.e., in the form of the steering input electrical signal) to, for example, an amount by which the flow control valve 140 is to open in order to provide a desired articulation of steerable components 160 (e.g., a desired amount rotation of the steerable components 160 about pivot locations 170 to achieve a desired angle A), such as in the case of a DSDA steering system, or a desired rate of articulation of the steerable components in the case of a DSRA steering system. The controller 130 also includes ramp rate information that is incorporated into the steering control signal in order to alter the rate at which desired steering response is achieved. More particularly, the ramp rate alters how quickly the steerable components 160 attain a velocity, such as an angular velocity, used to reach the desired angle A. Consequently, the ramp rate represents an acceleration value that is used to accelerate the steering apparatus 150 and steerable components 160 until the defined velocity is achieved. In some implementations, a DSDA steering system may involve both a desired amount of steering, i.e., an angle A of the steerable components, as well as a velocity applied to the steerable components 160 to achieve the angle A. A DSRA steering system involves a rate of angular movement (such as velocity and, more particularly, angular velocity) of the steerable components. In both cases, the ramp rate defines an acceleration applied in order to reach a desired velocity.

In some implementations, such as in the context of a DSRA steering system, the ramp rate represents the rate at which the flow control valve 140 operates (e.g., how quickly or slowly the flow control valve 140 changes from a first open position to a second open position) to achieve a particular flow rate of fluid passing through the flow control valve 140 corresponding to the steering input. The ramp rate is incorporated into the steering control signal produced by the controller 130. The fluid flow rate permitted through the flow control valve 140 is conducted to a steering apparatus 150 in fluid communication with the flow control valve 140. The steering apparatus 150 may include, for example, a gearing arrangement (e.g., rack and pinion gear arrangement or worm and roller gear arrangement) or a hydraulic cylinder. The steering apparatus 150 may alter a position of the steerable components 160 at a rate commensurate with the fluid flow rate passing through the flow control valve 140. In some implementations, the flow control valve 140 and the steering apparatus 150 may be or form part of a steering assembly.

Figure 2:
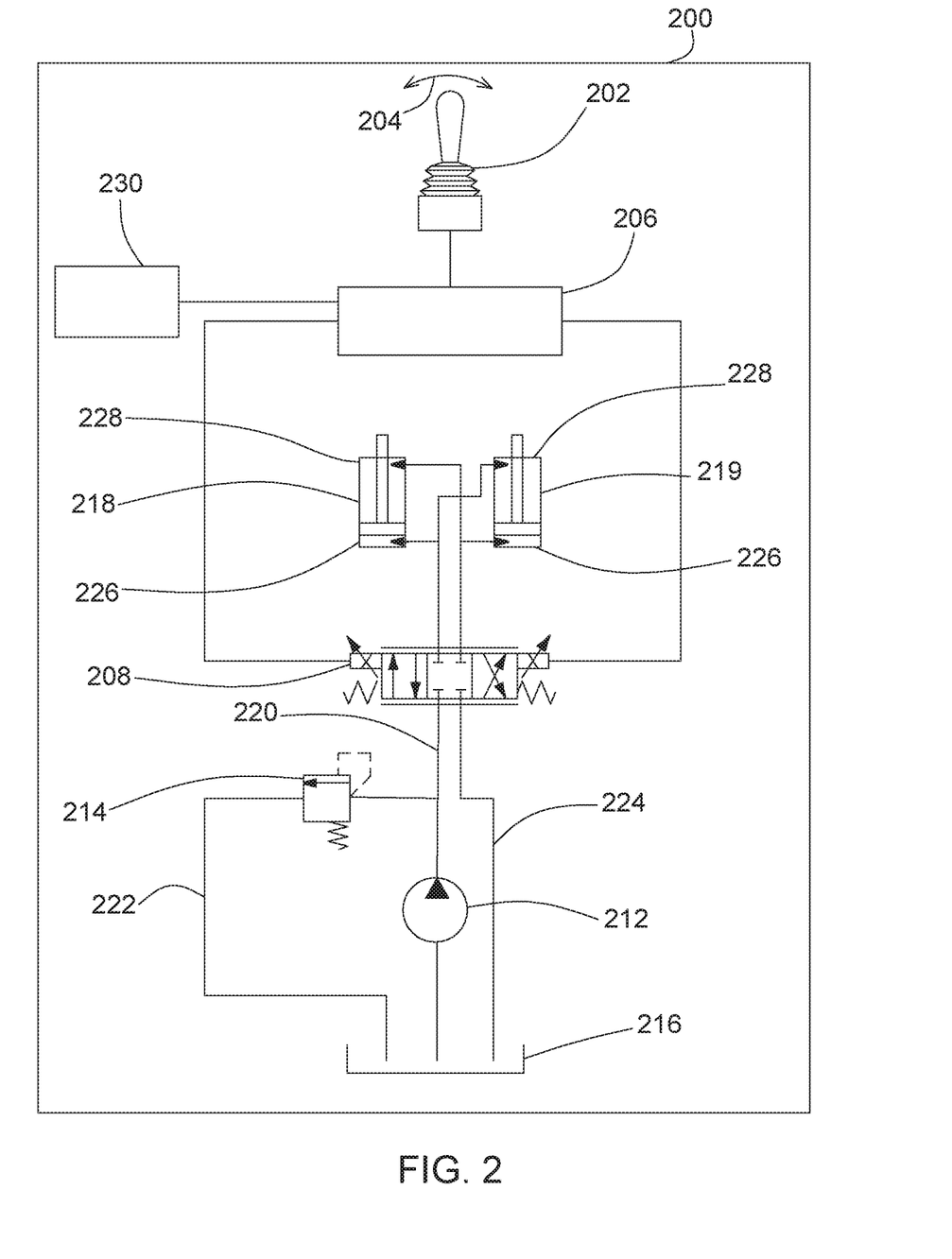
FIG. 2 is a schematic view of an example articulated steering system, according to some implementations of the present disclosure.

Example steering apparatuses include one or more cylinders, such as hydraulic cylinders, to perform articulated steering where one or more wheels or tracks are pivoted relative to one or more other wheels or tracks by displacing a portion of the vehicle relative to another portion of the vehicle, as shown, for example, in FIG. 2. Examples of articulated steering include agricultural or construction equipment in which a front portion of the vehicle having a set of wheels or tracks is pivotably connected to another portion of the vehicle having another set of wheels or tracks. To steer the vehicle, the different vehicle portions are pivoted relative to each other, such as with the use of one or more cylinders. As explained above, other types of steering apparatuses include a gearing arrangement or other device that operates to pivot one or more steerable wheels or tracks about an individual axis for each wheel or track. In some instances, this axis may be referred to as a kingpin axis. An example of this type of steering is used in conventional automobiles, which may include Akermann steering geometry.

For a DSDA steering system, the steering apparatus 150 operates in response to operation of the flow control valve 140 to turn the steerable components 160 by a defined amount (e.g., angle A) corresponding to the steering input. For an increased ramp rate, the flow control valve 140 changes position more quickly, and, commensurately, the steering apparatus 150 operates more quickly, i.e., with an increased acceleration, to cause the steerable components 160 to reach a desired rate of articulation, i.e., velocity. The steering apparatus 150 maintains articulation of the steerable components 160 at the desired velocity until the desired steering amount, which corresponds to the steering input applied to the control stick 120, is achieved. Similarly, for a reduced ramp rate, the steering control signal causes the flow control valve 140 to change position more slowly (in comparison to a larger ramp rate), which results in the steering apparatus 150 operating more slowly, i.e., at a reduced acceleration, to cause the steerable components 160 to reach the desired rate of articulation, i.e., velocity. Once the desired velocity is achieved, the steering apparatus 150 maintains movement of the steerable components 160 at the desired velocity. Although opening of the flow control valve 140 is described, operation of the flow control valve 140 in response to a steering input may also include reducing the size of the opening formed through the flow control valve 140.

The controller 130 also receives as an input a speed of the construction vehicle 110, such as ground speed of the construction vehicle 110. A speed sensor 180 may detect vehicle speed directly from the construction vehicle 110, such as from a wheel rotation sensor. In other implementations, the speed sensor 180 may be or include a global positioning system (GPS) sensor that detects vehicle speed using GPS techniques. In other implementations, the speed sensor 180 may be driveline or transmission output speed sensor or a radar system configured to detect a speed of the vehicle. The controller 130 uses the vehicle speed to adjust the ramp rate used to generate the steering control signal. For example, in some implementations, as the vehicle speed increases, a ramp rate may also increase, and the controller 130 modifies the steering control signal accordingly. Thus, in the context of a DSDA steering system, as the vehicle speed increases, an amount of time taken for the steerable components 160 to achieve a desired angular velocity decreases as a result of the increased ramp rate. The ramp rate alters how quickly the steerable components 160 attains an angular velocity used to reach the angle A. As explained earlier, use of an increased ramp rate as vehicle speed increases results in more responsive steering at greater vehicle speeds while also preserving operator comfort.

In the example of FIG. 1, the ramp rate defines how quickly the flow control valve 140 reacts to achieve the desired steering amount at the steerable components 160 in response to the steering input applied to the control stick 120. In the described example, the ramp rate changes based on vehicle speed and is progressive. That is, as the vehicle speed increases, the ramp rate increases.

In some implementations, the controller 130 may also include information, such as in the form of programming instructions, that adjusts the ramp rate applied to the steering control signal based on whether the present steering input is an increase or a decrease compared to a previous steering input. For example, in some implementations, for a given vehicle speed, where a steering input represents an increase compared to a previous steering input, the ramp rate may be less than a ramp rate for a steering input that represents a decrease compared to a previous steering input. As an example, for a given vehicle speed, an operator may reduce a steering input from 80 percent to 50 percent, resulting in a ramp rate that is greater than a ramp rate associated with a steering input that is changed from 50 percent to 80 percent.

FIG. 2 is a schematic view of an example articulated steering system 200, and the steering system 200 is in the form of a DSRA steering system. The steering system 200 includes input device in the form of a control stick 202. The control stick 202 receives a steering input from a user. Arrow 204 indicates directions in which the control stick 202 may be displaced to provide a steering input. As explained earlier, other types of devices may be used as the input device. The control stick 202 converts an applied steering input into an electrical signal, referred to as a steering input electrical signal. Here, movement of the control stick 202 (such as displacement from a neutral position by a selected amount) causes articulation of a vehicle at a rate corresponding to the degree to which the control stick 202 is deflected. Thus, for a greater degree of deflection, the rate of articulation increases. The rate of deflection may be considered the number of degrees per second that one portion of a vehicle is pivoted relative to another in the context of articulated steering.

A controller 206 receives the steering input electrical signals and outputs a flow request steering control signal that is transmitted to a flow control valve 208. The controller 206 includes steering input electrical signal versus flow request relationship information, which may be in the form of an algorithm, lookup table, or other correlation type. Thus, for a given steering input electrical signal, the controller 206 generates a steering control signal corresponding to the steering input electrical signal. The steering control signal controls the flow control valve 208 to produce a rate of fluid flow through the flow control valve 208. The rate of fluid flow through the flow control valve 208 results a corresponding rate of movement of a portion of a vehicle to effect steering of the vehicle. For example, the steering system 200 may be used on an articulating tractor to cause a first portion of the tractor that includes wheels or tracks to move or angularly deflect relative to another portion of the vehicle to which the first portion is pivotably connected. The steering control signal is transmitted to the flow control valve 208 where the flow control valve 208 is operated to provide a fluid flow rate to produce a desired rate of articulation of the steerable components corresponding to the steering input.

The controller 206 also incorporates ramp rate information into the steering control signal transmitted to the flow control valve 208. As explained earlier, the ramp rate controls the rate at which or how quickly the flow control valve 208 moves from one position to another.

The flow control valve 208 forms part of a hydraulic circuit 210. In addition to the flow control valve 208, the hydraulic circuit 210 includes a pump 212, a relief valve 214, a reservoir 216, and a pair of hydraulic cylinders 218 and 219. The pump 212 draws hydraulic fluid from the reservoir 216 and provides a pressurized fluid flow to a supply line 220. The relief valve 214 opens if the pressure of the hydraulic fluid exceeds a selected value. When the relief valve 214 opens, hydraulic fluid passes through a bypass line 222 to the reservoir 216. A return line 224 extends from the flow control valve 208 and returns hydraulic fluid from the hydraulic cylinders 218 and 219 to the reservoir 216.

In the illustrated example, the flow control valve 208 is a variable three-position solenoid valve. The flow control valve 208 includes a default closed position, a first open position, and a second open position. As the flow control valve 208 is moved into the first open position, hydraulic fluid from the supply line 220 is directed to a piston or first end 226 of the hydraulic cylinder 218 and a rod or second end 228 of the hydraulic cylinders 219. At the same time, hydraulic fluid from the second end 228 the hydraulic cylinder 218 and hydraulic fluid from the first end 226 of the hydraulic cylinder 218 is directed through the flow control valve 208 and into the return line 224 and, ultimately, into the reservoir 216. As a result, the hydraulic cylinder 218 extends, and the hydraulic cylinder 219 retracts. With the hydraulic cylinders 218 and 219 located on opposing sides of a vehicle, the opposing, simultaneous movements of the hydraulic cylinders 218 and 219 apply a moment to a first portion of the vehicle, causing the first portion of the vehicle to pivot relative to a second portion of the vehicle at a hinged connection. This pivoting action results in articulated steering of the vehicle in a first direction. Thus, the hydraulic cylinders 218 and 219 form a steering apparatus that functions to turn the vehicle. Although two hydraulic cylinders 218 and 219 are described in the example of FIG. 2, in other implementations, a single hydraulic cylinder may be used. Further, in still other implementations, more than two hydraulic cylinders may be used.

Due to the variable nature of the solenoid valve 208, as the amount that the flow control valve 208 moves into the first open position increases, the greater the amount of fluid flow and the quicker the hydraulic cylinders 218 and 219 are actuated. Conversely, as the amount by which the flow control valve 208 moves from the first open position to the default closed position increases, the amount of fluid flow passing through the flow control valve 208 decreases, resulting in a slower rate of articulation of the hydraulic cylinders 218 and 219.

Movement of the flow control valve 208 from the default closed position to the second open position directs hydraulic fluid from the supply line 220 into the second end 228 of the hydraulic cylinder 218 and into the first end 226 of the hydraulic cylinder 219. Simultaneously, hydraulic fluid from the first end 226 of the hydraulic cylinder 218 and hydraulic fluid from the second end 228 of the hydraulic cylinder 219 passes through the flow control valve 208, into the return line 224, and into the reservoir 216. As a result, the hydraulic cylinder 218 retracts, and the hydraulic cylinder 219 extends. The opposite and simultaneous opposing movements of the hydraulic cylinders 218 and 219 articulates the first portion of the vehicle to produce articulated steering of the vehicle in a second direction opposite the first direction.

Again, due to the variable nature of the flow control valve 208, as the amount by which the flow control valve 208 moves from the default closed position to the second open condition, the fluid flow permitted through the flow control valve 208 increases, and the rate at which the hydraulic valves 218 and 219 actuate also increases. Similarly, as the amount by which the flow control valve 208 moves from the second open position to the default closed position, the amount of fluid permitted to pass through the flow control valve 208 decreases. As a result, the rate at which the hydraulic cylinders 218 and 219 actuate also decreases.

The steering control signal from the controller 206 is transmitted to the flow control valve 208 to cause the hydraulic cylinders 218 and 219 to implement steering according to the steering input received by the control stick 202. The controller 206 also receives vehicle speed information from a ground speed sensor 230. The controller 206 uses the vehicle speed sensor to select a ramp rate that is incorporated into the steering control signal. In some implementations, the ramp rate may be affected based on whether the steering input is increasing compared to a previous input or whether the steering input is decreasing compared to a previous steering input.

The ramp rate affects how quickly the flow control valve 208 responds when moving from one position to another in response to changes in steering inputs. Thus, for a steering input that causes the flow control valve 208 to move from a first position that produces a first angular velocity to a second position that produces a second angular velocity greater than the first angular velocity, for example, the ramp rate defines how quickly the flow control valve 208 moves from the present position and, thus, the magnitude of an acceleration from the first angular velocity to the second angular velocity. Consequently, the ramp rate affects how quickly the flow control valve 208 moves within the variable range afforded by the valve from one position to the next.

In some implementations, the controller 206 recognizes the present setting of the flow control valve 208 and, when a steering input change is received from the control stick 202 via the steering input electric signal, the controller is operable to identify a new position of the flow control valve 208 based on the received steering input and determine how quickly the flow control valve 208 should operate (i.e., move) based on the vehicle speed, for example. The controller 206 selects a ramp rate based on the vehicle speed and generates a steering control signal that incorporates both the new steering input and the selected ramp rate. The controller 206 transmits the control signal to the flow control valve 208 to move the flow control valve 208 to the new position based on the new steering input and at a rate corresponding to the ramp rate. In some implementations, the steering control signal may be a signal based on modulation of electrical current or a signal based on modulation of electrical voltage. Other types of signals, e.g., optical, may also be used. In some implementations, as current or voltage increases, the rate at which the flow control valve 206 responds also increases. Conversely, as current or voltage decreases, the rate at which the control valve 208 responds decreases.

In some implementations, the controller 206 selects the ramp rate to control the rate at which the flow control valve 208 moves from one position to the next based, at least in part, on steering input. In other implementations, the controller 206 selects the ramp rate by considering not only the new position of the flow control valve 208 based on the steering input but also present position of the flow control valve 208.

Figure 3:
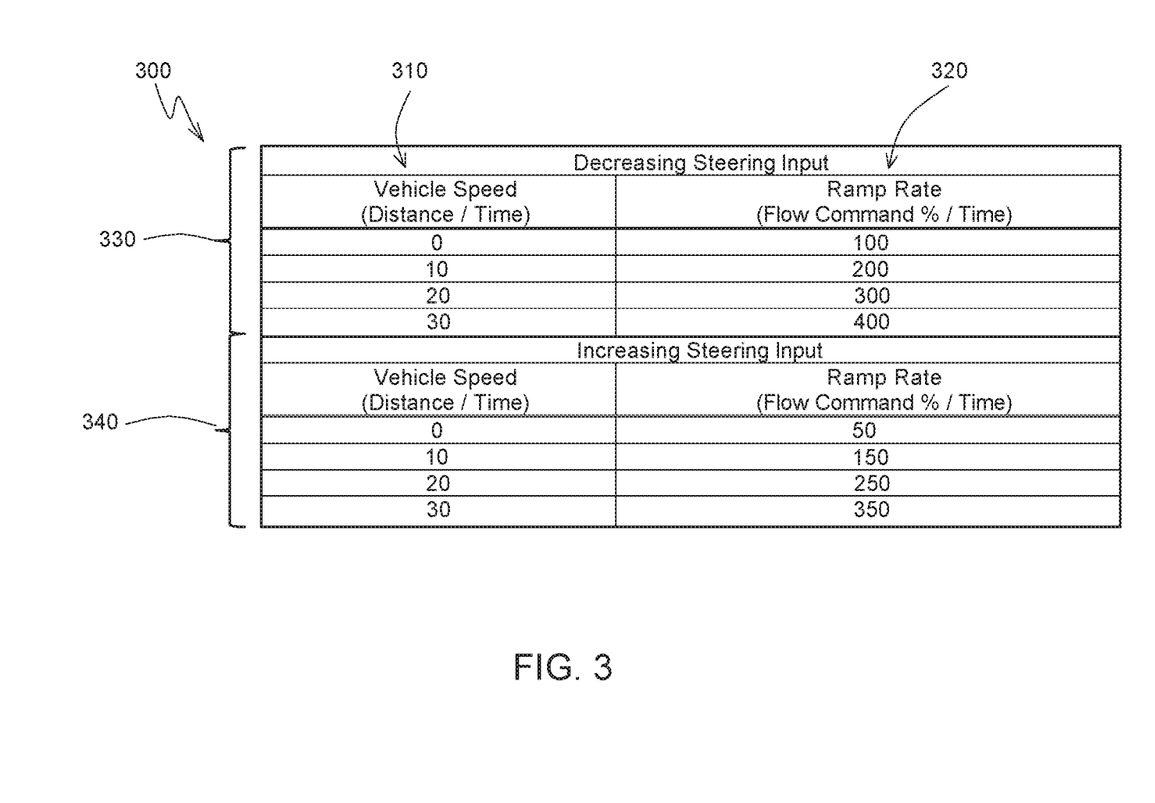
FIG. 3 is an example table correlating vehicle speed, steering input changes, and steering ramp rates, according to some implementations of the present disclosure.

FIG. 3 is an example table 300 showing how the ramp rates are adjusted based both on vehicle speed and whether the steering input is increasing or decreasing relative to a previous steering input. The table 300 includes a first column 310 that identifies a vehicle speed in distance per time, and a second column 320 that identifies a corresponding ramp rate for the given vehicle speed. In the illustrated example, the ramp rate is represented in terms of percentage (%) of flow control command per period of time. The table 300 is divided into a first portion 330 that is applicable to cases where the steering input is decreasing relative to a previous steering input, and a second portion 340 that is applicable to cases where the steering input is increasing relative to a previous steering input.

In implementations involving an electro-hydraulic steering system, when a steering input is applied to a control stick, such as control stick 120 or 202, by an operator, the steering input electrical signal produced by the control stick is read by a controller, such as controller 130 or 206. The controller converts the steering input electrical signal into a steering control signal and selects and incorporates a ramp rate into the steering control signal based on a lookup table, which may be similar to table 300. The steering control signal, which may be in the form of a requested flow percentage, is sent to a flow control valve, which may be similar to flow control valve 140 or 208. The flow control valve 140 responds by providing the requested flow rate of hydraulic fluid. The flow rate of hydraulic fluid operates to implement the steering input, such as by articulating steerable components, such as steerable components 160, by an amount corresponding to the steering input imparted by the operator, and the flow command to the valve is changed at a rate corresponding to the ramp rate obtained from the lookup table.

In the example table 300 of FIG. 3, the table 300 provides ramp rates for an electro-hydraulic steering system. The example ramp rates represent a percentage of flow per time, which describes how quickly a flow rate of the hydraulic fluid changes over time. Thus, the ramp rate represents how quickly a flow rate changes where the flow rate is a percentage of a maximum flow rate that is permitted through the flow control valve, such as flow control valves 140 or 208. In other implementations, ramp rates may be provided for an electronic steering system, and, consequently, the ramp rates may be provided in the form of an electrical gain.

Although table 300 is limited to four different ramp rates with each ramp rate corresponding to a different vehicle speed, other tables may include different granularity. For example, in other implementations, a table may include ramp rates for vehicles speeds at one km/h increments, five km/h increments, ten km/h increments, or sub- km/h increments. Further, although km/h is described, other tables may be provided in other units of speed. In some implementations, a controller, which may be similar to controller 130 or 206, may include a table similar to table 300, and the controller may use the table as a lookup table to determine applicable ramp rates based on a received vehicle speed and whether the received steering input is increasing or decreasing compared to a previous steering input. In some implementations, the ramp rate may be selected based on vehicle speed without concern for whether the steering input is greater than or less than a previous steering input.

When a lookup table is used, in some implementations, where the vehicle speed falls in-between values provided in a table, the controller may utilize interpolation to determine a ramp rate to apply to the steering control signal. In other implementations, the ramp rates selected on the basis of vehicle speed, changing steering inputs, or both, may be determined using a mathematical expression. A mathematical expression may determine a ramp rate using a vehicle speed as an input and, in some instances, an input related to whether a steering input is less than or greater than a previous steering input.

The ramp rates provided in table 300 are constant values, thereby providing linear rates of achieving a desired steering amount. For example, in the case of an electro-hydraulic steering system, the ramp rates contained in table 300 provide a linear rate at which a flow control valve, which may be similar to flow control valve 140 or 208, responds to cause a steering apparatus, such as steering apparatus 150, to the produce a desired steering response. Thus, a linear ramp rate controls a flow control valve to react in a linear fashion to accelerate a steerable component to a desired rate of articulation which may or may not correspond to the steering input. As the ramp rate increases, so does the rate at which the flow control valve responds.

In other implementations, the ramp rates may be non-linear. For example, in other implementations, one or more of the ramp rates may be in the form of an S-curve, as shown in the plot 400 of FIG. 4. The plot 400 represents a response of a flow control valve in the context of a DSRA steering system and shows a response of the flow control valve in response to a steering input. The y-axis represents an angular velocity (e.g., the rate at which steerable components of a vehicle are moved), and the x-axis represents time. The plot 400 includes a first, linear curve 410 that represents a linear or constant ramp rate and a second, non-linear curve 420 that represents a non-linear ramp rate. The first and second curves 410 and 420 extend between a first angular velocity 430 of the flow control valve (labeled as "A") and a second angular velocity 440 of the flow control valve (labeled as "B"). A slope of the first, linear curve 410 represents the associated ramp rate. The second, non-linear curve 420 is the form of an S-curve. The S-curve may be generated using a sigmoid function. In other implementations, other types of functions may be used to produce a ramp rate in the form of an S-curve. Still further, the shape of the ramp rate in the context of the plot 400 of FIG. 4 may have other shapes.

Figure 4:
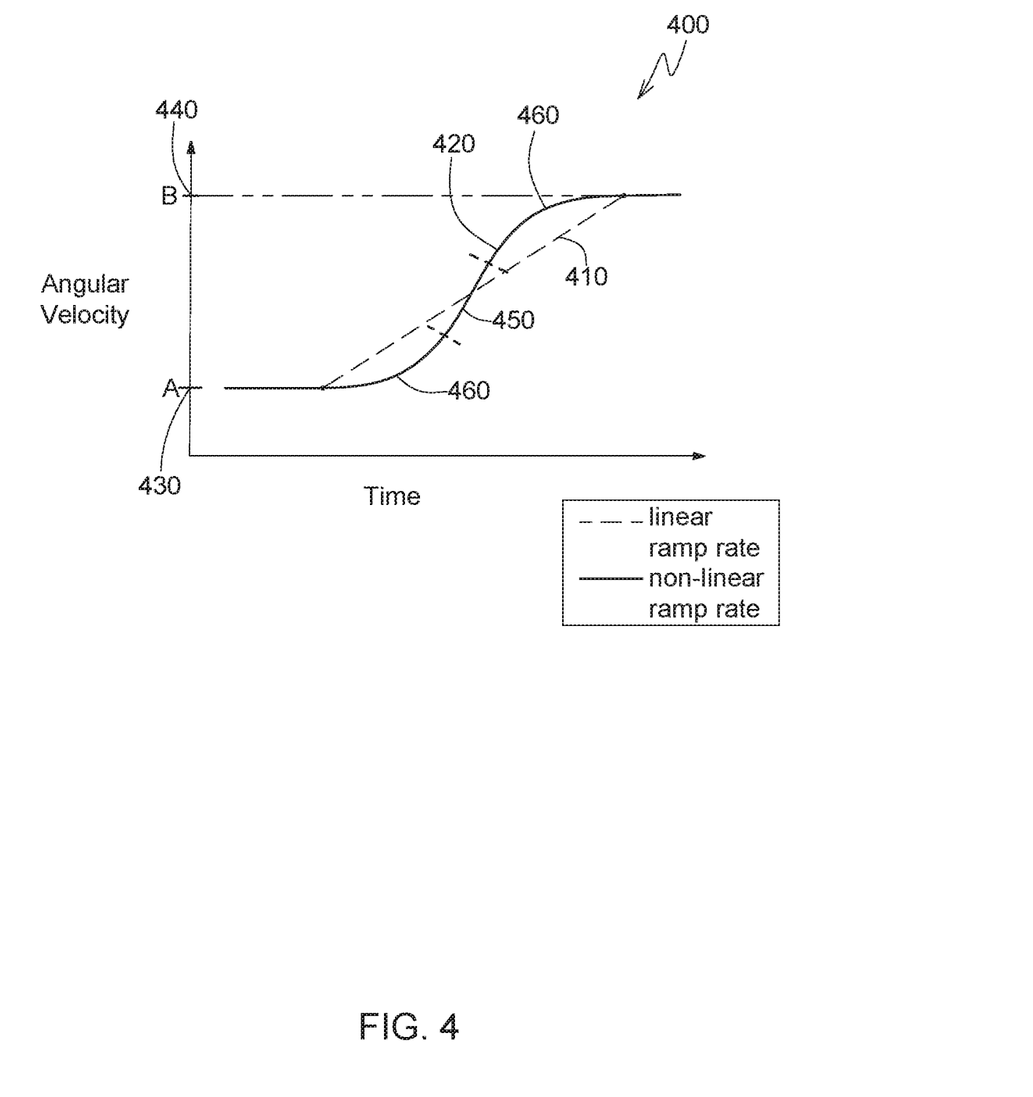
FIG. 4 is an example plot illustrating linear and non-linear ramp rates, according to some implementations of the present disclosure.

The second, non-linear curve 420 includes an intermediary portion 450 extending between curved end portions 460. In some implementations, the intermediary portion 450 may be a linear portion. A benefit of the non-linear curve 420 is that the curved end portions 460 provide a smoother steering operation and, therefore, a less jerky or jarring steering response. As a result, operator comfort is improved. Although FIG. 4 shows the curved end portions 450 having similar geometry, in other implementations, the curved end portions 460 may have different geometries. For example, a curved end portion corresponding to when the valve position begins to change may be less gradual compared to curved end portion located adjacent to the ending valve position. In other implementations, the curved end portion adjacent to the starting valve position may be more gradual than the curved end portion adjacent to the ending valve position.

In some implementations, a steering system within the scope of the present disclosure may also include progressive steering functionality. Progressive steering functionality involves altering an amount of steering, e.g., an angle by which steerable components are articulated or a rate at which steerable components are articulated, associated with a particular steering input based on vehicle speed. For example, at a particular speed, such as 20 km/h, a particular steering input may result in movement of a vehicles steering wheels (which may be correspond to angle A shown in FIG. 1) by a first amount or a rate of movement at a first rate. At an increased speed, such as 80 km/h, the amount of movement of the vehicle's steering wheels for the same particular steering input may be less than the amount of movement at 20 km/h or the rate of movement may be less than the rate of movement at 20 km/h.

Progressive steering functionality is distinguished from ramp rates in that ramp rates involve how quickly a steering system reaches a desired steering input, either in an angular displacement or a rate of displacement of steerable components that corresponds to a steering input, not the magnitude, in either amount of articulation or rate of articulation, of the steering response itself. Referring again to FIG. 1, the steering system 100 may include progressive steering functionality. Thus, for a particular steering input, the steerable components 160 may be pivoted to an angle A of 20 degrees at a vehicle speed of 20 km/h and an angle A of ten degrees at a vehicle speed 80 km/h. Assuming the ramp rate of the steering system 100 was the same at the speed of 20 km/h and 80 km/h, the ramp rate addresses how quickly the steering system attains the angle A, regardless as to whether the angle A is 20 degrees or ten degrees, once a steering input is received. The actual magnitude of the angle A is irrelevant with respect to ramp rates. For the steering system shown in FIG. 2, progressive steering involves a particular position of the flow control valve 208 that defines a particular flow rate of fluid through the flow control valve 208, and the ramp rate involves how quickly the flow control valve 206 changes positions to alter the fluid flow rate through the flow control valve 208.

Consequently, steering systems within the scope of the present disclosure include steering systems that utilize ramp rates that vary based on vehicle speed, whether the steering input is increasing or decreasing compared to a previous steering input, or both and that optionally include progressive steering functionality.

Figure 5:
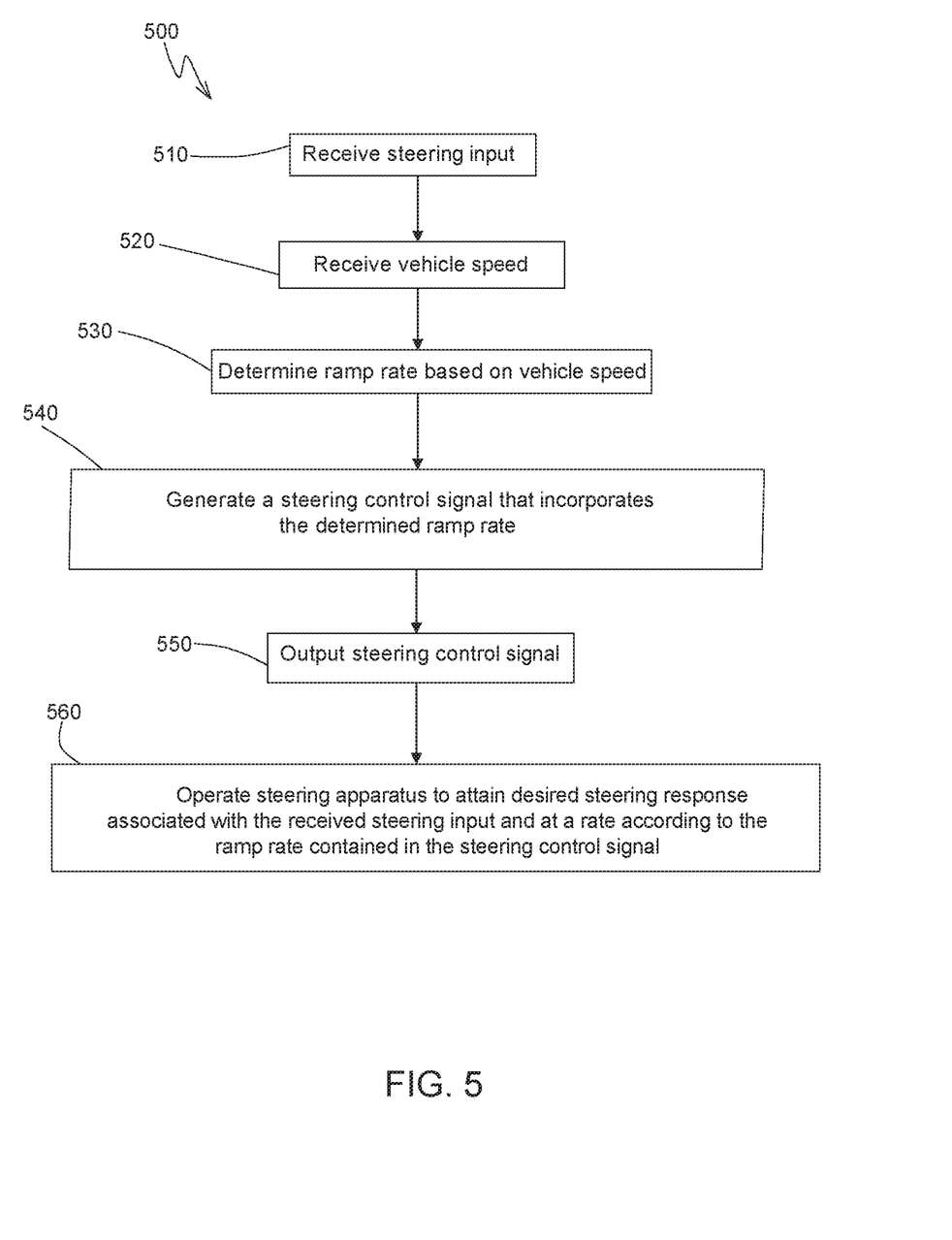
FIG. 5 is example flowchart for steering a vehicle based on a ramp rate selected in response to vehicle speed, according to some implementations of the present disclosure.

FIG. 5 is an example flowchart 500 for steering a vehicle, such as a construction vehicle having articulated steering, that uses a ramp rate selected in response to vehicle speed. At 510, a steering input is received. As explained earlier, a steering input may be applied to an input device, such as a control stick or a steering wheel, and the input device may generate a steering signal in response to the received steering input. At 520, a vehicle speed is received. A vehicle speed may be received from a vehicle speed sensor. The steering input signal and a vehicle speed may be received by a controller, which may be similar to controller 130 or 206. At 530, a ramp rate is determined using the received vehicle speed. In some implementations, a ramp rate may be determined using a lookup table that correlates ramp rate to vehicle speed. In other implementations, the ramp rate may be determined according to a mathematical relationship. Other ways of determining a ramp rate utilizing the vehicle speed may also be used. At 540, a steering control signal that incorporates the determined ramp rate is generated. At 550, the steering control signal is outputted, and, at 560, a steering apparatus, such as hydraulic cylinders similar to hydraulic cylinders 218 and 219, is operated to attain a steering response, corresponding to the steering input and at a rate according to the ramp rate contained in the steering control signal. Again, the ramp rate defines how quickly the steering apparatus accelerates the steerable component to a selected rate of articulation (e.g., how quickly the steerable component achieves a particular angular velocity).

In addition to vehicle speed, in some implementations, other factors may be used to determine the ramp rate. For example, whether a steering input is greater than or less than a previously received steering input may also affect the determined ramp rate. As explained earlier, in some implementations, for a given vehicle speed, where a steering input is less than a previous steering input, a ramp rate may be greater than a ramp rate associated with a steering input that is greater than a previous steering input.

Without in any way limiting the scope, interpretation, or application of the claims appearing below, a technical effect of one or more of the example embodiments disclosed herein is improved steering responsiveness and operator comfort for a vehicle, such as a construction vehicle.

Figure 6:
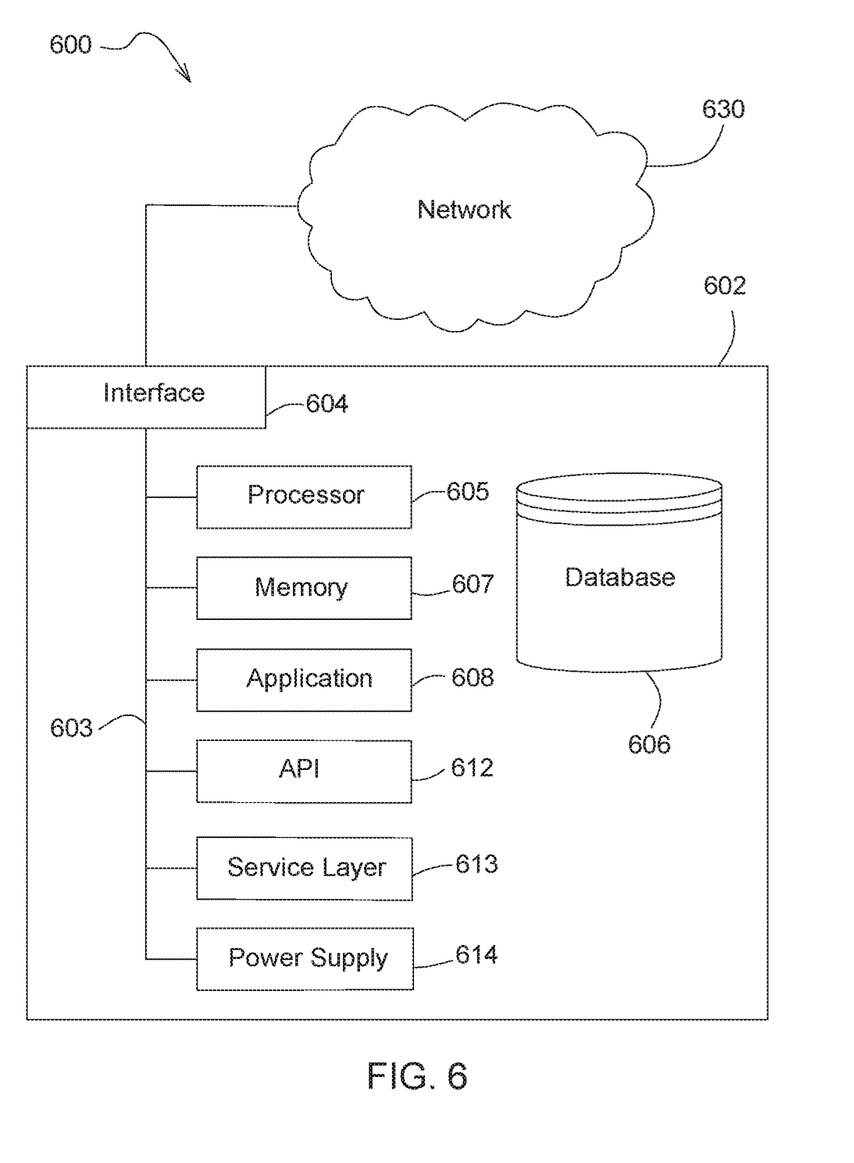
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 500 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method, including receiving a steering input from a steering input device; receiving a vehicle speed from a vehicle speed sensor; determining, with a controller, a desired steering response based on the steering input and a steering ramp rate that defines the rate at which the desired steering response is to be achieved by a steering assembly based on the received vehicle speed; and articulating at least one steerable vehicle wheel at the steering ramp rate to the desired steering response using the steering assembly.

The foregoing and other described implementations can each, optionally, include one or more of the following features:

A first feature, combinable with any of the previous or following features, wherein the steering response is a rate of articulation of the steering assembly.

A second feature, combinable with any of the previous or following features, wherein determining, with a controller, a desired steering response based on the steering input and a steering ramp rate that defines the rate at which the desired steering response is to be achieved by a steering assembly based on the received vehicle speed includes selecting the steering ramp rate from a lookup table based on the received vehicle speed.

A third feature, combinable with any of the previous or following features, wherein the steering ramp rates provided in the lookup table include linear steering ramp rates or non-linear steering ramp rates.

A fourth feature, combinable with any of the previous or following features, the method further including outputting a steering control signal that incorporates the steering ramp rate and the desired steering response from the controller; and transmitting the steering control signal to the steering assembly.

A fifth feature, combinable with any of the previous or following features, wherein the steering assembly includes a flow control valve, and further including controlling a size of an opening formed in the flow control valve and at a rate according to the determined steering ramp rate using the steering control signal.

A sixth feature, combinable with any of the previous or following features, the method further including comparing the steering input to a previously received steering input; and adjusting the steering ramp rate based on the comparison between the steering input and the previously received steering input.

An seventh feature, combinable with any of the previous features, wherein, for a particular vehicle speed, the adjusted steering ramp rate is greater when the steering input is less than the previously received steering input than the adjusted steering ramp rate when the steering input is greater than the previously received steering input.

In a second implementation, a non-transitory, computer-readable medium storing one or more instructions executable by a computer system to perform operations including receiving a steering input from a steering input device; receiving a vehicle speed from a vehicle speed sensor; determining, with a controller, a desired steering response based on the steering input amount and a steering ramp rate that defines the rate at which the desired steering amount response is to be achieved by a steering assembly based on the received steering input and the received vehicle speed; and articulating at least one steerable vehicle wheel at the steering ramp rate to the desired steering amount response using the steering assembly.

The foregoing and other described implementations can each, optionally, include one or more of the following features:

A first feature, combinable with any of the previous or following features, wherein the steering response is a rate of articulation of the steering assembly.

A second feature, combinable with any of the previous or following features, wherein determining, with a controller, a desired steering response based on the steering input and a steering ramp rate that defines the rate at which the desired steering response is to be achieved by a steering assembly based on the received vehicle speed includes selecting the steering ramp rate from a lookup table based on the received vehicle speed.

A third feature, combinable with any of the previous or following features, wherein the steering ramp rates provided in the lookup table include linear steering ramp rates or non-linear steering ramp rates.

A fourth feature, combinable with any of the previous or following features, the computer-readable medium further including instructions executable by the computer system to perform operations including outputting a steering control signal that incorporates the steering ramp rate and the desired steering response from the controller; and transmitting the steering control signal to the steering assembly.

A fifth feature, combinable with any of the previous or following features, wherein the steering assembly includes a flow control valve, and further including controlling a size of an opening formed in the flow control valve and at a rate according to the determined steering ramp rate using the steering control signal.

A sixth feature, combinable with any of the previous or following features, the computer-readable medium further including instructions executable by the computer system to perform operations including comparing the steering input to a previously received steering input; and adjusting the steering ramp rate based on the comparison between the steering input and the previously received steering input.

An seventh feature, combinable with any of the previous features, wherein, for a particular vehicle speed, the adjusted steering ramp rate is greater when the steering input is less than the previously received steering input than the adjusted steering ramp rate when the steering input is greater than the previously received steering input.

In a third implementation, a computer-implemented system including one or more processors and a non-transitory computer-readable storage medium coupled to the one or more processors and storing programming instructions for execution by the one or more processors, the programming instructions instructing the one or more processors to: receive a steering input from a steering input device; receive a vehicle speed from a vehicle speed sensor; determine, with a controller, a desired steering response based on the steering input and a steering ramp rate that defines the rate at which the desired steering response is to be achieved by a steering assembly based on the received vehicle speed; and articulate at least one steerable vehicle wheel at the steering ramp rate to the desired steering response using the steering assembly.

The foregoing and other described implementations can each, optionally, include one or more of the following features:

A first feature, combinable with any of the previous or following features, wherein the steering response is a rate of articulation of the steering assembly.

A second feature, combinable with any of the following features, wherein the programming instructions operable to determine, with a controller, a desired steering response based on the steering input and a steering ramp rate that defines the rate at which the desired steering response is to be achieved by a steering assembly based on the received vehicle speed include programming instructions instructing the one or more processors to select the steering ramp rate from a lookup table based on the received vehicle speed.

A third feature, combinable with any of the previous or following features, wherein the steering ramp rates provided in the lookup table include linear steering ramp rates or non-linear steering ramp rates.

A fourth feature, combinable with any of the previous or following features, the system further including programming instructions instructing the one or more processors to: output a steering control signal that incorporates the steering ramp rate and the desired steering response from the controller; and transmit the steering control signal to the steering assembly.

A fifth feature, combinable with any of the previous or following features, wherein the steering assembly includes a flow control valve, and the system further including programming instructions operable to instruct the one or more processors to control a size of an opening formed in the flow control valve and at a rate according to the determined steering ramp rate using the steering control signal.

A sixth feature, combinable with any of the previous or following features, the system further including programming instruction operable to instruct the one or more processors to: compare the steering input to a previously received steering input; and adjust the steering ramp rate based on the comparison between the steering input and the previously received steering input.

An seventh feature, combinable with any of the previous features, wherein, for a particular vehicle speed, the adjusted steering ramp rate is greater when the steering input is less than the previously received steering input than the adjusted steering ramp rate when the steering input is greater than the previously received steering input.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A steering system for a vehicle comprising:
   a steering input device operable to receive a steering input and generate a steering input electrical signal in response to the received steering input;
   a controller operable to:
      receive the steering input electrical signal;
      receive a vehicle speed;
      determine a steering ramp rate based on the received vehicle speed; and
      output a steering control signal, based on the steering input electrical signal, that incorporates the steering ramp rate; and
   a steering apparatus operable to receive the steering control signal and articulate at least one steerable component based on the steering control signal,
   wherein the steering control signal causes the steering apparatus to control a rate of articulation of the at least one steerable component, and
   wherein the ramp rate defines how quickly the steering apparatus changes the rate of articulation of the at least one steerable component from a first rate of articulation of the at least one steerable component corresponding to a first steering input received by the steering input device to a second rate of articulation of the at least one steerable component corresponding to a second steering input received by the steering input device, the first rate of articulation being different from the second rate of articulation.

2. The steering system of claim 1, wherein the controller is adapted to determine the ramp rate based on both the steering input and the vehicle speed.

3. The steering system of claim 1, wherein the steering apparatus comprises a flow control valve, wherein the flow control valve is operable to receive the steering control signal and adjust a position of the flow control valve according to the received steering control signal.

4. The steering system of claim 3, wherein the flow control valve is a variable valve, wherein a position of the variable valve defines a fluid flow through the variable valve, and wherein the steering ramp rate defines the rate at which the variable valve changes from a first position to a second position.

5. The steering system of claim 1, further comprising a vehicle speed sensor operable to detect the vehicle speed and transmit the vehicle speed to the controller.

6. The steering system of claim 1, wherein the controller comprises a lookup table that correlates vehicle speed to steering ramp rates, and wherein the controller is operable to select the steering ramp rate based on the received vehicle speed using the lookup table.

7. A method for steering a vehicle, the method comprising:
   receiving a steering input from a steering input device;
   receiving a vehicle speed from a vehicle speed sensor;
   determining, with a controller, a desired steering response based on the steering input and a steering ramp rate that defines a rate at which the desired steering response is to be achieved by a steering assembly based on the received vehicle speed; and
   articulating at least one steerable vehicle component at the steering ramp rate to the desired steering response using the steering assembly,
   wherein the ramp rate defines how quickly a rate of articulation of the at least one steerable vehicle component changes from a first rate of articulation of the at least one steerable vehicle component to a second rate of articulation of the at least one steerable vehicle component different from the first rate of articulation of the at least one steerable vehicle component.

8. The method of claim 7, wherein determining, with a controller, the desired steering response based on the steering input and the steering ramp rate comprises selecting the steering ramp rate from a lookup table based on the received vehicle speed.

9. The method of claim 7, further comprising:
   outputting a steering control signal that incorporates the steering ramp rate and the desired steering response from the controller; and
   transmitting the steering control signal to the steering assembly.

10. The method of claim 9, wherein the steering assembly comprises a flow control valve and further comprising controlling a size of an opening formed in the flow control valve and at a rate of operation of the flow control valve according to the determined steering ramp rate using the steering control signal.

11. The method of claim 7, further comprising:
comparing the steering input to a previously received steering input received from the steering input device; and
adjusting the steering ramp rate based on the comparison between the steering input and the previously received steering input.

12. The method of claim 11, wherein, for a particular vehicle speed, the adjusted steering ramp rate is greater when the steering input is less than the previously received steering input than the adjusted steering ramp rate when the steering input is greater than the previously received steering input.

13. The method of claim 11, wherein for a particular vehicle speed, the adjusted steering ramp rate is greater when the steering input is greater than the previously received steering input than the adjusted steering ramp rate when the steering input is less than the previously received steering input.

14. A vehicle comprising:
at least one steerable component;
a steering input device operable to receive a steering input and generate a steering input electrical signal in response to the steering input;
a controller operable to:
receive the steering input electrical signal;
receive a vehicle speed;
determine a steering ramp rate based on the received steering input electrical signal and the received vehicle speed; and
output a steering control signal that incorporates the steering ramp rate; and
a steering apparatus operable to receive the steering control signal and articulate the at least one steerable component based on the steering control signal,
wherein the ramp rate defines how quickly the steering apparatus changes a rate of articulation of the at least one steerable component from a first rate of articulation of the at least one steerable component to a second rate of articulation of the at least one steerable component different from the first rate of articulation of the at least one steerable component.

15. The vehicle of claim 14, further comprising a flow control valve, wherein the flow control valve receives the steering control signal, and wherein a position of the flow control valve is altered in response to the steering control signal and the determined steering ramp rate.

16. The vehicle of claim 15, wherein the steering apparatus comprises a hydraulic cylinder in fluid communication with the flow control valve, wherein the hydraulic cylinder moves the at least one steerable component from the first rate of articulation to the second rate of articulation in response to the received steering input.

17. The vehicle of claim 14, wherein the controller comprises a lookup table that correlates vehicle speed to steering ramp rates, and wherein the controller is operable to select the steering ramp rate based on the received vehicle speed using the lookup table.

* * * * *